(No Model.)
F. J. SINGLETON & R. R. DE LA GILTONNIERE.
WHEEL GUARD FOR VEHICLES.
No. 602,480. Patented Apr. 19, 1898.
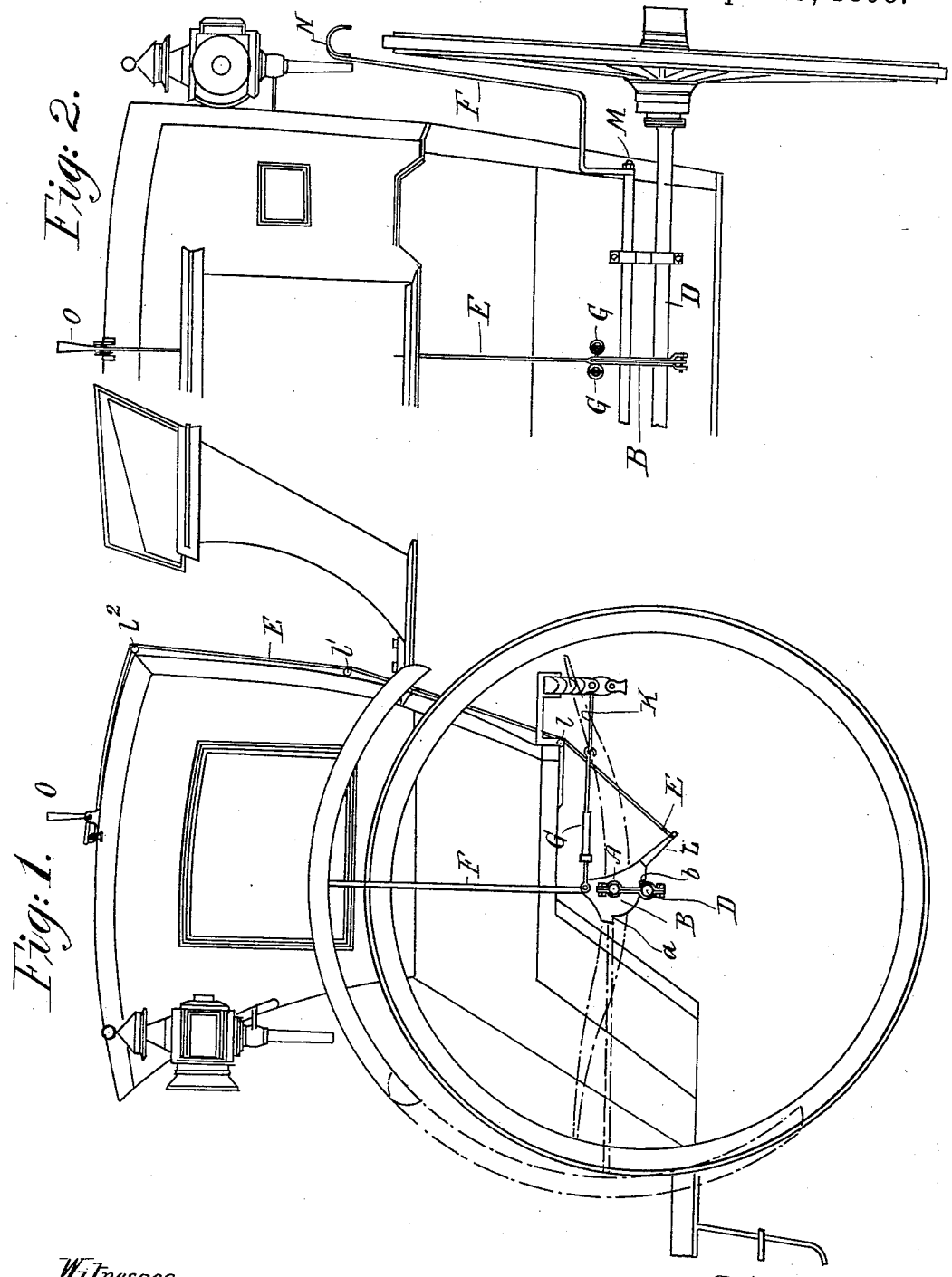
Witnesses.
George Hughes
Leonard Edmund Haynes
Inventors.
F. J. Singleton
R. R. de la Giltonniere
per H. Sefton Jones
Attorney

United States Patent Office.

FREDERICA JULIA SINGLETON AND RAOUL ROBICHON DE LA GILTONNIERE, OF HAZELEY, ENGLAND.

WHEEL-GUARD FOR VEHICLES.

SPECIFICATION forming part of Letters Patent No. 602,480, dated April 19, 1898.

Application filed July 19, 1897. Serial No. 645,184. (No model.)

*To all whom it may concern:*

Be it known that we, FREDERICA JULIA SINGLETON, married lady, and RAOUL ROBICHON DE LA GILTONNIERE, gentleman, subjects of the Queen of Great Britain, residing at Hazeley, Winchfield, Hampshire, England, have invented a certain new and useful Adjustable Wheel-Guard for Vehicles, of which the following is a specification.

Our invention relates to an improved adjustable shield or mud-guard for the wheels of vehicles, especially those of the "hansom-cab" pattern or in which the wheel tends to come in contact with the clothes of a person making use of the vehicle.

The apparatus consists, essentially, of a bar of suitable strength and length placed above the axle of the wheels to which the guard is to be applied and sufficiently near to the said axle so that the motion of the guard will be nearly concentric with that of the wheel. The bar is supported in this position by suitable bearings, which may be conveniently attached to the axle of the vehicle. At the center or other convenient point of the said bar is placed an angle-piece or segment having projections which form cams limiting its motion. This piece is firmly secured to the transverse bar and moves with the same. To its upper part is secured a lever or projection provided with a strap, chain, or other mechanism, which terminates at a convenient point where it is under the control of the driver. To the upper part of the said cam-piece is fixed a controlling spring or springs, preferably spiral and attached to the spring of the vehicle, so adjusted as to maintain the bar and the cam-piece attached thereto in such a position that the mud-guard is raised out of action except when the driver by drawing on the cord or chain revolves the cam-piece and the transverse bar against the pressure of the spring and causes the mud-guard to descend into the working position. To the end of the transverse bar is attached a bent lever or levers supporting the mud-guard aforesaid. In most cases we prefer to affix a similar guard at each end of the bar, thus protecting both wheels of the vehicle. This mud-guard, as aforesaid, is normally held in position away from the front of the vehicle or covering the upper part of the wheel. When required to be brought into use, it is lowered by the drawing up of the cord or chain aforesaid against the pressure of the controlling-spring, and it then passes down over the wheel until its further progress is prevented by the projecting cam of the center piece resting upon the axle of the vehicle, and in consequence of its eccentricity with regard to the wheel the mud-guard is brought almost or entirely into contact with the rim of the wheel. In this position the guard completely encircles the portion of the wheel which is liable to come in contact with the clothes of the rider and affords a complete protection to the same. As soon as the need for this protection is passed the driver releases the cord and the spring at once revolves the transverse bar and raises the guard into its normal position.

It is obvious that our invention is capable of considerable modification in details to adapt it to vehicles of various descriptions and that in the case of vehicles having more than two wheels we may adapt the apparatus to each pair of wheels or to the wheels on one side of the car only or otherwise, as may be desirable.

Referring to the accompanying drawings, Figure 1 shows a side view of a hansom-cab with the apparatus in place, portions of the wheel being shown broken away for the purpose of showing the same more distinctly. The dotted lines show the position of the guard when lowered. Fig. 2 shows a view from behind of part of the apparatus applied to a hansom-cab.

In the drawings like letters refer to the same parts throughout.

The transverse bar A is supported in bearings D, secured to the axle of the cab by clamps bolted together, as shown. The central cam-piece B is firmly keyed upon the transverse bar A and revolves with it. Its upper part bears a cam $a$ and has attached to it the spring G, as shown. The lower part bears the cam $b$ and terminates in a lever L, to which is attached a cord or chain E, which passes over suitable pulleys $l\ l'\ l^2$ and is prolonged to a convenient point within reach of the driver, such as the lever O.

To the end of the transverse bar A is secured the bent bar F by means of the threaded nut M. To this bent bar F the mud-guard N is attached.

When the apparatus is at rest, the guard is maintained in the position shown in Fig. 1 by the tension of the spiral spring G, Fig. 1, attached to the upper part of the cam-piece B, and the lower cam $b$ of the said piece rests against the wheel-axle. When the driver draws down the handle O, the strap or cord E causes the bar L to move upward and the cam-piece revolves until the cam $a$ strikes against the wheel-axle. By this motion the mud-guard N is depressed into the position shown in dotted lines in Fig. 1. As soon as the handle O and the cord E are released the spring G revolves the cam-piece and the guard is raised to its normal position.

What we claim is—

1. In combination with a vehicle, an adjustable wheel-guard, a bar supporting the same, a transverse bar rigidly attached to the said bar, bearings supporting the transverse bar revolubly, a spring-controlled cam-plate fixed upon the transverse bar, a projecting arm secured to the said cam-plate, and a draw-line attached to the said projecting arm.

2. In combination with a vehicle-axle a transverse bar revolving in bearings secured on the said axle, bent levers secured to the ends of said bar, wheel-guards secured to said bent levers, a cam-plate fixed upon the said transverse bar, cams on said cam-plate limiting the revolution of said bar, a spring controlling the said cam-plate, and means for revolving the cam-plate against the tension of the spring.

3. In combination with the adjustable wheel-guard N, the bent lever E, the transverse revoluble bar A, the cam-plate B, the draw-spring G, the cam-plate lever L and the draw-line E.

In testimony whereof we have signed our names to this specification in the presence of two subscribing witnesses.

FREDERICA JULIA SINGLETON.
R. ROBICHON DE LA GILTONNIERE.

Witnesses:
HUBERT SEFTON JONES,
GEORGE HUGHES.